United States Patent [19]

Araki et al.

[11] 4,379,183

[45] Apr. 5, 1983

[54] METHOD OF PRODUCING COBALT-MODIFIED MAGNETIC PARTICLES

[75] Inventors: Yasuo Araki, Kawachinagano; Hajime Uno, Sakai; Shigeharu Higuchi, Sakai; Seiji Matsumoto, Sakai, all of Japan

[73] Assignee: Sakai Chemical Industry Co., Ltd., Osaka, Japan

[21] Appl. No.: 322,667

[22] Filed: Nov. 18, 1981

[30] Foreign Application Priority Data

Jan. 20, 1981 [JP] Japan .................................. 56-7633

[51] Int. Cl.$^3$ ............................................. C01G 49/06
[52] U.S. Cl. .................................. 427/127; 252/62.56; 427/128
[58] Field of Search ....................... 423/632, 633, 634; 252/62.56; 427/127, 128

[56] References Cited

U.S. PATENT DOCUMENTS

| | | | |
|---|---|---|---|
| 3,252,758 | 5/1966 | Hoch et al. | 423/634 |
| 3,262,755 | 7/1966 | Steinmetz et al. | 423/633 |
| 3,845,198 | 10/1974 | Marcot | 423/634 |
| 4,202,871 | 5/1980 | Matsumoto et al. | 423/632 |

FOREIGN PATENT DOCUMENTS 2905352  8/1980  Fed. Rep. of Germany ...... 423/634

*Primary Examiner*—Jack Cooper
*Attorney, Agent, or Firm*—Wenderoth, Lind & Ponack

[57] ABSTRACT

A method of producing cobalt-modified magnetic particles is provided. The method comprises heating an aqueous suspension of ferric hydroxide at temperatures of 100°–250° C. at an alkaline pH in the presence of a water soluble organic or inorganic compound capable of forming complexes with iron as a growth regulating agent, and preferably also in the presence of α-ferric oxide seed crystals of minor axes not larger than 0.4 microns in average in amounts of 0.1–25 mole % in terms of the Fe content thereof in relation to the ferric hydroxide, converting the obtained α-ferric oxide into γ-ferric oxide by reduction thereof followed by oxidation, maintaining an aqueous suspension of the γ-ferric oxide at temperatures of 30°–50° C. at an alkaline pH in the presence of ferrous hydroxide and cobaltous hydroxide in amounts of 0.5–50 mole %, respectively, in relation to the Fe content of the γ-ferric oxide in the suspension for a length of time sufficient to modify the γ-ferric oxide particles.

16 Claims, No Drawings

METHOD OF PRODUCING COBALT-MODIFIED MAGNETIC PARTICLES

The present invention relates to a method of producing cobalt-modified magnetic particles particularly useful for the production of magnetic recording media.

Recent developments in magnetic recording media such as audio tapes, video tapes, and other magnetic recording tapes and discs require improved crystallographic and magnetic properties of magnetic particles used therein. It is already known that $\gamma\text{-}Fe_2O_3$ particles are improved in magnetic recording properties by incorporating cobalt thereinto, and various methods have been proposed to cobalt-modify $\gamma\text{-}Fe_2O_3$ particles. But almost all the methods require heat treatment of $\gamma\text{-}Fe_2O_3$ suspension containing ferrous hydroxide and cobaltous hydroxide at high temperatures such as 200°–500° C. Therefore, a cobalt-modification method at lower temperatures has been recently proposed, in which an aqueous suspension of $\gamma\text{-}Fe_2O_3$ particles containing ferrous hydroxide and cobaltous hydroxide is heated at an alkaline pH. This improved method permits employment of relatively low temperatures ranging from 50° C. to 100° C. upon the heat treatment of the suspension, but a heat treatment at temperatures lower than 50° C. provides magnetic particles of only very low coercive force even after a long treatment time.

Another aspect of cobalt-modification is concerned with $\gamma\text{-}Fe_2O_3$ particles used therefor. $\gamma\text{-}Fe_2O_3$ particles have heretofore been produced by calcining acicular goethite or $\gamma\text{-}FeOOH$ at a temperature of about 300° C. for dehydration thereof to provide acicular $\gamma\text{-}Fe_2O_3$ particles, reducing the $\gamma\text{-}Fe_2O_3$ particles by heating thereof at temperatures of about 300°–400° C. in a hydrogen atmosphere to provide magnetite, and then by oxidizing the magnetite to $\gamma\text{-}Fe_2O_3$ particles.

However, the dehydration reaction of goethite in the method generates a number of pin holes or voids in the $\alpha\text{-}Fe_2O_3$ particles produced through which voids the water formed during the reaction evaporates. The voids still remain in magnetite or $\gamma\text{-}Fe_2O_3$ produced from the $\alpha\text{-}Fe_2O_3$, to make the magnetic particles porous, and therefore cause a lowering of the magnetic recording properties of the particles. Furthermore, the goethite tends to change its shape, for example, by fusing together at angles, during the calcination because of its tactoidal structure, and the resulting $\alpha\text{-}Fe_2O_3$ particles have irregular shapes containing a number of dendrites, protuberances and branches. This makes the required uniform orientation of magnetic particles on the recording media difficult, and causes deterioration of performance of the resulting recording media.

In order to obviate the above difficulties, a method of producing well defined, single crystalline, acicular $\alpha$-ferric oxide particles has been realized, in which an aqueous suspension of ferric hydroxide is heated at an alkaline pH in the presence of an agent dissolved in the suspension to regulate or control the growth of crystals, and such "growth regulating agents" include organic phosphonic acids and hydroxycarboxylic acids (U.S. Pat. No. 4,202,871 to Matsumoto et al.). The method provides relatively well defined, acicular $\alpha\text{-}Fe_2O_3$ particles substantially with neither voids nor branches therein. However, the $\alpha\text{-}Fe_2O_3$ particles thus obtained have been found to have a relatively wide range of particle size distribution. Accordingly, it is still desired to produce acicular $\alpha\text{-}Fe_2O_3$ particles of smaller particle size distribution, which will further improve crystallographic and magnetic properties of $\gamma\text{-}Fe_2O_3$ particles produced from the $\alpha\text{-}Fe_2O_3$ particles.

Therefore, it is an object of the invention to provide a method of producing cobalt-modified magnetic particles which employs a heat treatment at temperatures not higher than 50° C. of $\gamma\text{-}Fe_2O_3$ particles of improved crystallographic and magnetic recording properties.

According to the invention, there is provided a method of producing cobalt-modified magnetic particles which comprises: heating an aqueous suspension of amorphous ferric hydroxide at an elevated temperature from 100° C. to 250° C. at an alkaline pH in the presence of an effective amount of a growth regulating agent dissolved in the suspension, and preferably also in the presence of $\alpha\text{-}Fe_2O_3$ seed crystals of minor axes not more than 0.4 microns in average in amounts of 0.1–25 mole % in terms of Fe content in relation to the ferric hydroxide in the suspension, the growth regulating agent being selected from the group consisting of an organic phosphonic acid, a hydroxycarboxylic acid, a polybasic acid, an aminocarboxylic acid, a polyamine, a thioalcohol, an aminosulfonic acid, a polyhydric alcohol, an aromatic sulfonic acid, a $\beta$-dicarbonyl compound and a thiocarboxylic acid, for a length of time sufficient to convert the amorphous ferric hydroxide into acicular $\alpha\text{-}Fe_2O_3$ particles, converting the $\alpha\text{-}Fe_2O_3$ particles to acicular $\gamma\text{-}Fe_2O_3$ particles by reduction of the $\alpha\text{-}Fe_2O_3$ particles followed by oxidation thereof, maintaining an aqueous suspension of $\gamma\text{-}Fe_2O_3$ particles at temperatures from 30°–50° C. at an alkaline pH in the presence of ferrous hydroxide and cobaltous hydroxide in amounts of 0.5–50 mole %, respectively, in relation to the Fe content of the $\gamma\text{-}Fe_2O_3$ in the suspension for a length of time sufficient to modify the particles.

The starting amorphous ferric hydroxide may be prepared by any known conventional method such as by adding an alkali, e.g., sodium hydroxide, potassium hydroxide or ammonia, to an aqueous solution of water soluble ferric salt, e.g., ferric chloride, ferric sulfate or ferric nitrate, or by oxidizing ferrous hydroxide in water. For example, the ferric hydroxide is prepared by adding an alkali to an aqueous solution of a water soluble ferric salt until the alkalinity of the mixture reaches a pH where almost all the iron content therein precipitates quantitatively as amorphous ferric hydroxide. After filtering off and washing, the precipitates are suspended in water. The thus obtained ferric hydroxide may have therein instead of hydroxyl anion a certain amount of other anions such as chlorine, nitrate or sulfonate originating from the starting ferric salt used depending on the reaction conditions, and such ferric hydroxide may also be used as the starting ferric hydroxide.

The starting suspension contains therein ferric hydroxide in amounts not large enough so that the stirring of the suspension in the presence of growth regulating agent and seed crystals is difficult, and preferably in amounts not more than 1.5 moles/liter, more preferably in amounts of 0.1–1 mole/liter, in terms of the Fe content.

The growth regulating agent herein means an organic or an inorganic compound which is soluble in water, stable under the reaction conditions, namely under heating to at least 100° C. in an alkaline medium, and capable of forming a complex with ferric iron, thereby to regulate or control the direction and speed of growth of α-Fe₂O₃ crystals produced during the heating of the ferric hydroxide suspension to provide well defined acicular α-Fe₂O₃ crystals. In a reaction system where the growth regulating agent is absent, the α-Fe₂O₃ crystals formed have a cubic, platelet or mica-like shape.

An organic growth regulating agent therefore has at least one coordination atom in the molecule such as oxygen, nitrogen and sulfur, and preferably at least one group containing such atoms. Examples of such groups include —OH, —COOH, —O—, =CO, —SO₃H, —PO₃H₂, —NH₂, =NOH, ≡N, —SH, —S—, =CS and —OCN. Preferred organic growth regulating agents have two or more coordination groups in the molecule. Preferable organic growth regulating agents include an phosphonic acid and a hydroxycarboxylic acid which are already known as hereinbefore mentioned, and furthermore a polybasic acid, an aminocarboxylic acid, a polyamine, a polyhydric alcohol, a thioalcohol, an aminosulfonic acid, an aromatic sulfonic acid, a thiocarboxylic acid and a β-dicarbonyl compound. The growth regulating agent also includes a salt and an ester of the above compounds so far as they are soluble in water, stable in a heated alkaline media, and capable of forming complexes with ferric iron. Inorganic growth regulating agents include phosphates such as sodium phosphate, potassium phosphate and ammonium phosphate.

Various compounds may be used as growth regulating agents in the invention as is described above, however the most preferable are a hydroxycarboxylic acid and an organic phosphonic acid. The hydroxycarboxylic acid includes citric acid, tartaric acid, glycolic acid, malic acid, α-methylmalic acid, α-hydroxyglutaric acid, dihydroxyglutaric acid, propyltatronic acid, agaritic acid, norcaperatic acid, desoxalic acid and salicyclic acid. Aliphatic α-hydroxycarboxylic acids are preferred. The hydroxycarboxylic acids may be used in the form of a free acid, a water soluble salt or a water soluble ester.

A first class of preferred organic phosphonic acids is represented by the formula:

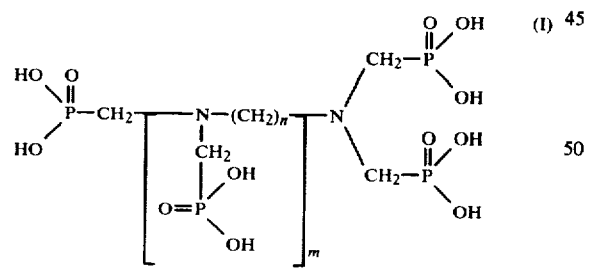

wherein n and m are repeating units and preferably n is 2 to 6, and m is 0 to 5. Specific examples of the class of compounds include aminotri (methylenephosphonic acid), ethylenediaminetetra(methylenephosphonic acid), hexamethylenediaminetetra(methylenephosphonic acid), diethylenetriaminepenta(methylenephosphonic acid), triethylenetetraminehexa(methylenephosphonic acid), tetraethylenepentaminehepta(methylenephosphonic acid), and pentaethylenehexamineocta(methylenephosphonic acid).

A second class of preferable organic phosphonic acids has the following formula:

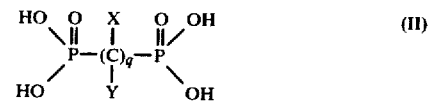

wherein X and Y are hydrogen, hydroxy, amino, or $C_1$–$C_6$ alkyl or aryl, and q is 1 to 6. Specific examples thereof include methylenediphosphonic acid, ethylene-1,1′-diphosphonic acid, ethylene-1,2-diphosphonic acid, propylene-1,1′-diphosphonic acid, propylene-1,3-diphosphonic acid, hexamethylene-1,6-diphosphonic acid, 2,4-dihydroxypentamethylene-2,4-diphosphonic acid, 2,5-dihydroxyhexamethylene-2,5-diphosphonic acid, 2,3-dihydroxybutylene-2,3-diphosphonic acid, 1-hydroxybenzyl-1,1′-diphosphonic acid and 1-aminoethylene-1,1′-diphosphonic acid. Particularly, hydroxyalkylene-1,1′-diphosphonic acids of the formula:

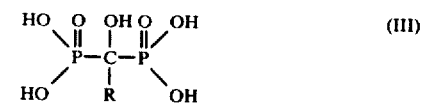

wherein R is hydrogen or $C_1$–$C_5$ alkyl, such as hydroxymethylenediphosphonic acid, 1-hydroxypropylene-1,1′-diphosphonic acid, 1-hydroxybutylene-1,1′-diphosphonic acid and 1-hydroxyhexamethylene-1,1′-diphosphonic acid are preferable. The organic phosphonic acid may be used in the form of a free acid, a water soluble salt or a water soluble ester.

Some examples of other classes of growth regulating agents may be as follows:
polybasic acids: propane-1,2,3-tricarboxylic acid
aminocarboxylic acids: tyrosine
polyamines: tris(2-aminoethyl)amine
polyhydric alcohols: pentaerythritol
aromatic sulfonic acids: sulfophenyliminodiacetic acid
thioalcohols: mercaptoethyliminodiacetic acid
aminosulfonic acids: taurine However, it will be apparent that various compounds may be used as an effective growth regulating agent in the invention from the definition of the growth regulating agent.

The amount of growth regulating agent in the suspension is preferably between $1 \times 10^{-5}$ moles and 3 moles, more preferably between $1 \times 10^{-4}$ moles and $1 \times 10^{-1}$ moles per 1 mole of the ferric hydroxide. The use of too small an amount of growth regulating agent will not provide α-Fe₂O₃ crystals of well defined acicular configuration while the use of too large an amount of agent will require a much longer reaction time.

According to the invention, the amorphous ferric hydroxide suspension is heated preferably in the presence both of growth regulating agent and α-Fe₂O₃ seed crystals since the use of seeds provides α-Fe₂O₃ particles of narrow particle size distribution as well as of improved crystallographic and magnetic properties.

The crystal configuration of seed crystals may vary, for example, acicular, platelet, globular or cubic. However, the minor axis of seed crystal should not be larger than 0.4 microns in average, preferably not larger than 0.2 microns in average. The minor axis herein means the shortest axis or diameter of crystal when the crystal is acicular, platelet or globular, and the shortest edge when the crystal is cubic. When α-Fe₂O₃ crystals of minor axes larger than 0.4 microns in average are used as seeds, the resulting acicular $\alpha$-Fe$_2$O$_3$ crystals have small "acicularity" which is herein defined as the ratio of major axes to minor axes of the crystals in average, but also large particle size. As a result, the $\alpha$-Fe$_2$O$_3$ particles will fail to provide magnetic particles of high performance. The lower limit of average length of minor axes of seed crystals may be about 100 Å, although not critical. $\alpha$-Fe$_2$O$_3$ particles on the market produced by conventional methods, i.e., particles of average length of minor axes between 0.4 microns and 100 Å, may be used as seed crystals in the invention.

The seed crystals are preferably present in the ferric hydroxide suspension in amounts of 0.1-25 mole %, more preferably 0.5-15 mole % in terms of Fe content in relation to the ferric hydroxide in the suspension. When the seeds are present in amounts smaller than 0.1 mole % in terms of Fe content in relation to the ferric hydroxide, the resulting $\alpha$-Fe$_2$O$_3$ will be larger in particle size whereas if the seeds are present in amounts of more than 25 mole %, the resulting $\alpha$-Fe$_2$O$_3$ particles will be smaller in acicularity and/or particle size.

It is sufficient that the growth regulating agent and the seeds are present in the ferric hydroxide suspension when the suspension is heated. That is, any method may be employed to prepare the starting suspension of ferric hydroxide containing the agent and seeds therein. Therefore, for example, the agent and/or seeds may be added to an aqueous solution of water soluble ferric salt, and then an alkali is added to the mixture to precipitate the ferric hydroxide. In this case, the growth regulating agent may be incorporated into the ferric hydroxide precipitates, and further addition of agent to the resultant ferric hydroxide suspension may be omitted. However, it is preferred that a ferric hydroxide suspension first be prepared, and then the agent and seeds be added to the suspension.

The aqueous suspension of ferric hydroxide having the agent and seeds is then subjected to a heat treatment at an elevated temperature at an alkaline pH with stirring for a period of time sufficient to convert the amorphous ferric hydroxide into the desired acicular $\alpha$-Fe$_2$O$_3$ particles. The pH of the suspension is adjusted at larger than 7, preferably 8-12.5 by the addtition thereto of an alkali, e.g., sodium hydroxide, potassium hydroxide or ammonia. The alkali may be added to the suspension before or after the addition of the agent and seed crystals to the suspension.

The reaction temperature is not lower than 100° C. When the reactio is carried out at temperatures below 100° C., the obtained $\alpha$-Fe$_2$O$_3$ particles have branching structures, e.g., crosswise or T-shape, and include goethite particles. That is, the obtained $\alpha$-Fe$_2$O$_3$ particles are of crystallographic configuration less defined and less acicular. The upper limit of reaction temperature depends on decomposition points of growth regulating agent used, and usually the reaction temperature is between 100° C. and 250° C., preferably between 130° C. and 200° C. The reaction time varies depending upon the other reaction conditions, and usually between several tens of minutes and several hours. The reaction is usually carried out in a closed vessel such an autoclave with stirring. There is no particular need to carry out the reaction under an increased pressure. The reaction mixture is filtered, and the product is washed with water and dried.

The $\alpha$-Fe$_2$O$_3$ particles thus obtained according to the invention have substantially neither voids nor branches therein, and hence are of high density, but also have narrow distribution of particle size.

The acicular $\alpha$-Fe$_2$O$_3$ particles thus obtained are converted into $\gamma$-Fe$_2$O$_3$ particles for the production of cobalt-modified magnetic particles. The $\alpha$-Fe$_2$O$_3$ particles may be converted into $\gamma$-Fe$_2$O$_3$ particles in any method well known in the art. For instance, the acicular $\alpha$-Fe$_2$O$_3$ particles are reduced by heating thereof at temperatures of 300°-500° C. in a hydrogen atmosphere to magnetite which well retains the acicular configuration of the starting $\alpha$-Fe$_2$O$_3$ particles, and then the magnetite is oxidized with air at temperatures of 200°-300° C. to provide $\gamma$-Fe$_2$O$_3$ particles which also well retain the acicular configuration of the starting $\alpha$-Fe$_2$O$_3$ particles. The resulting $\gamma$-Fe$_2$O$_3$ particles have substantially neither voids nor branches therein, and hence are of high density, and in addition thereto narrow particle size distribution when the seeds are used. Therefore, the cobalt-modified magnetic particles produced from the $\alpha$-Fe$_2$O$_3$ particles according to the method specified hereinbefore are well defined, acicular particles of improved magnetic recording properties.

It is said that higher temperatures are desired on cobalt-modification of $\gamma$-Fe$_2$O$_3$ particles to provide magnetic particles of high performance. However, unexpectedly it has been found that the $\gamma$-Fe$_2$O$_3$ from the $\alpha$-Fe$_2$O$_3$ produced by the method above with the use of growth regulating agent and preferably of $\alpha$-Fe$_2$O$_3$ seed crystals should be cobalt-modified at exceptionally low temperatures from 30° C. to 50° C., preferably from 35° C. to 45° C., thereby to provide magnetic particles of improved magnetic recording properties such as normalized switching field distribution.

The concentration of $\gamma$-Fe$_2$O$_3$ particles in the aqueous suspension is usually between 0.1 moles/liter and 2 moles/liter so that the suspension is effectively stirred together with ferrous and cobaltous hydroxide in an alkaline pH. In the invention, $\gamma$-Fe$_2$O$_3$ particles may be first dispersed in an aqueous solution of an alkali such as sodium hydroxide and potassium hydroxide, and then with stirring are added thereto an aqueous suspension of ferrous hydroxide and cobaltous hydroxide, and dispersed therein with the $\gamma$-Fe$_2$O$_3$ particles. Alternatively, an aqueous solution of ferrous salt, e.g., ferrous chloride, and cobaltous salt, e.g., cobaltous sulfate, is first prepared, and the solution is added to an aqueous alkaline suspension of $\gamma$-Fe$_2$O$_3$ particles so as to convert the salts to hydroxides. The amounts of ferrous hydroxide and cobaltous hydroxide in the starting suspension range from 0.5 mole % to 50 mole %, respectively, and preferably from 1 mole % to 10 mole %, respectively, in relation to the Fe content of the $\gamma$-Fe$_2$O$_3$. The use of the hydroxides in amounts smaller than the above specified will result in substantially no improvement of magnetic performance of the product whereas the use in amounts larger than the above specified will provide magnetically unstable particles.

The concentration of hydroxyl ion of the alkali in the suspension on the cobalt-modification is usually 0.5-5 moles/liter, and preferbly 1-3 moles/liter. When the cobalt-modification is carried out in the presence of alkali smaller than 0.5 moles/liter, there results little improvement in magnetic properties of the obtained magnetic particles. On the other hand, the use of alkali more than 5 moles/liter brings about no further improvement on magnetic properties of magnetic particles formed compared with those of magnetic particles prepared by the use of 0.5–5 moles/liter of alkali, and hence execess use of alkali is uneconomical.

According to the invention, since the cobalt-modification reaction is carried out at low temperatures, the atmosphere of the reaction may either be non-oxidative or oxidative.

The thus treated $\gamma$-Fe$_2$O$_3$ particles are filtered off, washed with water, and dried at temperatures usually below 150° C. to provide cobalt-modified magnetic ferric oxide particles. The drying of the product is preferably carried out in an inert atmosphere, but may be carried out in the air depending upon the magnetic properties required.

It is to be understood that the $\gamma$-Fe$_2$O$_3$ particles used for the cobalt-modification are such that they are produced from $\alpha$-Fe$_2$O$_3$ particles which are prepared in specified manners as described hereinbefore, and therefore can be cobalt-modified at low temperatures. The thus obtained magnetic particles have substantially neither voids nor branches therein, and are well defined, uniform acicular crystals of high density, and therefore provide magnetic recording media of improved magnetic performance, particularly squareness ratio. From the viewpoint of production thereof, cobalt-modification is carried out at low temperatures so that energy cost is remarkably decreased. Furthermore, since the modification may be carried out in the air, the production cost is also reduced.

When desired, the magnetic particles obtained may be further oxidized at 250°–300° C. to convert the magnetite contained therein into $\gamma$-Fe$_2$O$_3$ particles of higher performance.

The invention will be more readily understood with reference to the following examples; however, these examples are intended to illustrate the invention and are not to be construed as limiting the scope of the invention.

EXAMPLE 1

To 30 liters of an aqueous solution of ferric chloride (Fe content, 16.7 g/liter) was added a 10% aqueous solution of sodium hydroxide with stirring until the pH of the solution became 7.5. The resulting red-brown amorphous precipitates were filtered off, washed with about 20 liters of hot water. The precipitates were then suspended in water to prepare 10 liters of ferric hydroxide suspension.

To the suspension were added 16 g of aminotri(methylene phosphonic acid), and then a 5% aqueous solution of sodium hydroxide to adjust the suspension at a pH of 11.2. The suspension was then heated at a temperature of 150° C. for 90 minutes.

The resulting orange-red precipitates were filtered off, washed with water and air-dried to provide acicular $\alpha$-Fe$_2$O$_3$ particles of 0.6 microns in average major axes and 0.08 microns in average minor axes. The thus obtained $\alpha$-Fe$_2$O$_3$ particles were reduced by heating in a rotary electric furnace in a hydrogen atmosphere at 330°–340° C. for 2 hours, and then air-oxidized slowly at temperatures of 150°–200° C. for 1 hour to provide acicular $\gamma$-Fe$_2$O$_3$ particles of coercive force of 450 Oe.

300 g of the $\gamma$-Fe$_2$O$_3$ particles were dispersed in 2.5 liters of 2.5 moles/liter aqueous solution of sodium hydroxide. A mixed aqueous solution of 0.36 moles/liter ferrous sulfate and 0.15 moles/liter cobaltous sulfate was added to the alkaline suspension of $\gamma$-Fe$_2$O$_3$, mixed thoroughly, and then maintained at temperatures shown in Table 1 in the air for length of time also shown in the table for the cobalt-modification of $\gamma$-Fe$_2$O$_3$ particles. The resulting product was filtered off, washed with water and dried in a nitrogen atmosphere at a temperature of 140° C. for 2 hours, to provide cobalt-modified magnetic particles.

100 Parts by weight of magnetic particles thus obtained were added to and mixed with a vehicle composed of 5 parts by weight of nitrocellulose, 2.5 parts by weight of vinyl chloridevinyl acetate copolymer, 17.5 parts by weight of urethane resin and 253 parts by weight of organic solvent containing therein an effective amount of dispersing agent, to prepare a magnetic paint. The paint was applied onto a polyethylene terephthalate tape to form a layer about 10 microns thick and dried by a method well known in the art to provide a magnetic recording tape. The magnetic properties of the tape are shown in Table 1 as runs 1 to 3.

REFERENCE EXAMPLE 1

The $\gamma$-Fe$_2$O$_3$ particles obtained in EXAMPLE 1 were cobalt-modified in the same manner at a temperature of 80° C., and the resulting magnetic particles were applied on a film in the same manner as before. The magnetic properties of the obtained magnetic recording tapes are shown in Table 1 as runs 4 and 5. The difference in treating temperatures gave no substantial influence upon the coercive force of the magnetic particles, however, it will be apparent that the tape with the magnetic particles of the invention was remarkably improved in squareness ratio.

For further comparison, $\alpha$-Fe$_2$O$_3$ particles were produced by heating acicular goethite at a temperature of about 300° C. for 1 hour. The resulting $\alpha$-Fe$_2$O$_3$ particles were convereted into $\gamma$-Fe$_2$O$_3$ particles in the same manner as in EXAMPLE 1. The $\gamma$-Fe$_2$O$_3$ particles of coercive force of 400 Oe were applied on a tape in the similar manner as described before to prepare a magnetic recording tape. The magnetic properties of the tapes are shown in Table 1 as runs 6 and 7.

TABLE 1

| Runs | Modification Conditions | | Properties Of Magnetic Tapes | |
|---|---|---|---|---|
| | Temperature (°C.) | Time (hr) | Coercive force (Oe) | Squareness ratio (Br/Bm) |
| 1 | 40 | 1 | 650 | 0.86 |
| 2 | 40 | 3 | 675 | 0.85 |
| 3 | 40 | 5 | 675 | 0.85 |
| 4 | 80 | 1 | 670 | 0.81 |
| 5 | 80 | 3 | 675 | 0.82 |
| 6 | 40 | 3 | 600 | 0.81 |
| 7 | 80 | 5 | 650 | 0.81 |

EXAMPLE 2

Into 3 liters of an aqueous solution of ferric sulfate (Fe content, 17.0 g/liter) was bubbled ammonia gas with stirring until the pH of the solution became 7.5.

The resulting red-brown, amorphous precipitates were filtered off and washed with about 2 liters of hot water. The precipitates were suspended in water to prepare 1 liter of ferric hydroxide suspensions.

To the suspension were added 1.1 g of acicular $\alpha$-Fe$_2$O$_3$ seed crystals (Fe content, 1.5 mole % in relation to ferric hydroxide) 200 A in average minor axes as a slurry dispersed in water and 3.35 g of ethylenediaminetetra(methylenephosphonic acid), and then a 5% aqueous solution of sodium hydroxide to adjust the suspension at a pH of 11.0. The suspension was then heated in a closed vessel at a temperature of 180° C. for 30 minutes with stirring.

The resultant red-orange precipitates were filtered off, washed with water and air-dried to provide 72 g of the desired acicular particles. The particles were identified as $\alpha$-$Fe_2O_3$ by X-ray diffraction crystallography. By the electron microscopic observation on 200 crystals of $\alpha$-$Fe_2O_3$ thus obtained, they were found to be acicular crystals 0.1 microns in average minor axis and 0.6 microns in average major axis.

The $\alpha$-$Fe_2O_3$ particles were converted into $\alpha$-$Fe_2O_3$ particles in the same manner as in EXAMPLE 1 of coercive force of 470 Oe.

300 g of the $\alpha$-$Fe_2O_3$ particles thus obtained were dispersed in 2.5 liters of 2.0 moles/liter of sodium hydroxide, and to the resultant alkaline suspension was added an aqueous solution containing 0.36 moles/liter of ferrous sulfate and 0.15 moles/liter of cobaltous sulfate. The mixture was thoroughly mixed and then maintained at a temperature of 40° C. for 4 hours with stirring. The resulting product was filtered off and dried at a temperature of 140° C. for 2 hours in a nitrogen atmosphere to provide cobalt-modified magnetic particles.

In the same manner as in EXAMPLE 1 the magnetic particles obtained were applied on a polyethylene terephthalate tape. The coercive force and squareness ratio of the tape were 670 Oe and 0.86, respectively.

EXAMPLES 3-20

Acicular $\alpha$-$Fe_2O_3$ particles were prepared in the same manner as in EXAMPLE 2, and the sizes thereof are shown in Table 2 together with starting ferric salts and alkalis, $\alpha$-$Fe_2O_3$ seed crystals and growth regulating agents used, and the reaction conditions. The $\alpha$-$Fe_2O_3$ particles were converted into $\gamma$-$Fe_2O_3$ particles in the same manner as in EXAMPLE 1, and the $\gamma$-$Fe_2O_3$ particles were then cobalt-modified to magnetic particles in the same manner as in EXAMPLE 2 under the conditions shown in Table 3. The thus obtained particles were applied on a polyethylene terephthalate tape to prepare magnetic tapes in the same manner as in EXAMPLE 1. The magnetic properties of the tapes are shown in Table 3.

EXAMPLES 21-23

$\alpha$-$Fe_2O_3$ particles were prepared in the same manner as in EXAMPLES 7, 11 and 12, respectively, except the absence of seed crystals. The $\alpha$-$Fe_2O_3$ particles were then converted into $\gamma$-$Fe_2O_3$ particles in the same manner as in EXAMPLE 1, and the $\gamma$-$Fe_2O_3$ particles were cobalt-modified in the same manner under conditions shown in Table 3. Magnetic recording tapes were prepared in the same manner as described hereinbefore with the cobalt-modified particles, and the magnetic properties of the tapes are shown in Table 3.

TABLE 2
Preparation of α-Fe₂O₃ Particles

| EXAMPLES | Preparation of Fe(OH)₂ Ferric Salts (Fe·g) | Alkalis | α-Fe₂O₃ Seed Crystals Shape and Size (microns when not specified) | Amounts Used (mole %)[1] | Growth Regulating Agents | Amounts Used (g) | Reaction Conditions pH | Time (hr) | Temp. (°C.) | Size of Acicular[2] α-Fe₂O₃ Obtained |
|---|---|---|---|---|---|---|---|---|---|---|
| 3 | FeCl₃ (50.1) | NaOH | Hexagonal plate 700 Å dia. 200 Å thick | 10 | Aminotri(methylene phosphonic acid) | 1.6 | 11.2 | 1 | 150 | 0.7 × 0.1 |
| 4 | FeSO₄[3] (26.0) | NaOH | Acicular[2] 0.2 × 0.05 | 5 | Diethylenetriamine-hepta(methylene phosphonic acid) | 2.0 | 11.7 | 0.5 | 190 | 0.5 × 0.08 |
| 5 | Fe(NO₃)₃ (55.5) | NaOH | Acicular 0.2 × 0.05 | 5 | 1-Hydroxyethylene-1,1'-diphosphonic acid | 1.0 | 12.0 | 0.5 | 170 | 0.7 × 0.07 |
| 6 | FeCl₃ (30.4) | NaOH | Cubic 400 Å | 5 | Mixture of Diethylene-triaminepenta(methylene-phosphonic acid, Triethy-lenetetraminehexa(methy-lenephosphonic acid) and Tetraethylenepentamine-hepta(methylenephosphonic acid) | 3.0 | 11.0 | 1 | 180 | 0.8 × 0.1 |
| 7 | FeCl₃ (20.1) | NH₃ | Acicular 0.4 × 0.2 | 20 | Sodium citrate | 11.9 | 3 | 130 | 0.8 × 0.2 | |
| 8 | FeCl₃ (22.8) | NaOH | Cubic 200 Å | 3 | 116 ml of 0.1 M solution dl-Monomethyl tartarate | 3.3 | 9.3 | 2 | 150 | 0.6 × 0.1 |
| 9 | Fe₂(SO₄)₃ (25.0) | NaOH | Cubic 200 Å | 3 | Agaricic acid | 5.3 | 11.8 | 0.5 | 170 | 0.5 × 0.1 |
| 10 | FeCl₃ (34.2) | NaOH | Cubic 200 Å | 3 | dl-Malic acid | 1.2 | 10.4 | 2 | 120 | 0.8 × 0.1 |
| 11 | Fe(NO₃)₃ (25.0) | NaOH | Cubic 200 Å | 3 | dl-Tartaric acid 2H₂O Sodium citrate 2H₂O | 0.2 0.8 | 11.3 | 1 | 180 | 0.6 × 0.06 |
| 12 | Fe₂(SO₄)₃ (18.0) | NaOH | Cubic 200 Å | 3 | Desoxalic acid | 3.3 | 10.2 | 2 | 150 | 0.8 × 0.1 |
| 13 | Fe(NO₃)₃ (40.0) | NaOH | Acicular 0.3 × 0.05 | 4 | 1-Aminoethylene-1,1'-diphosphonic acid | 0.7 | 9.8 | 0.5 | 220 | 0.7 × 0.08 |
| 14 | FeCl₃ (34.0) | NaOH | Acicular 0.3 × 0.05 | 4 | Taurine | 2.1 | 11.0 | 2 | 140 | 0.7 × 0.1 |
| 15 | Fe₂(SO₄)₃ (55.5) | NaOH | Acicular 0.3 × 0.05 | 10 | Mercaptoethylimino-diacetic acid | 6.1 | 11.5 | 1 | 150 | 0.5 × 0.1 |
| 16 | FeCl₃ (34.0) | NaOH | Acicular 0.3 × 0.05 | 15 | Tyrosine | 3.5 | 12.0 | 0.5 | 180 | 0.5 × 0.1 |
| 17 | FeCl₃ (34.0) | NaOH | Acicular 0.3 × 0.05 | 10 | Propane-1,2,3-tri-carboxylic acid | 4.2 | 11.5 | 1 | 170 | 0.9 × 0.08 |
| 18 | Fe(NO₃)₃ (40.0) | NaOH | Acicular 0.3 × 0.05 | 10 | Tris(2-aminoethyl)-amine | 2.7 | 11.0 | 1 | 170 | 0.6 × 0.1 |
| 19 | FeCl₃ (34.0) | NaOH | Acicular 0.3 × 0.05 | 5 | Pentaerythritol | 3.8 | 10.5 | 4 | 120 | 0.7 × 0.1 |
| 20 | FeCl₃ (34.0) | NaOH | Acicular 0.3 × 0.05 | 10 | Sulfophenylimino-diacetic acid | 5.4 | 11.0 | 2 | 150 | 0.5 × 0.1 |

[1] Mole % in relation to the ferric hydroxide in the suspension.
[2] Major axis length (microns) × minor axis length (microns)
[3] Ferrous sulfate was oxidized with H₂O₂ at a pH of 0.9 and an alkali was added to an aqueous solution of the ferric salt.

TABLE 3

| EXAMPLES | γ-Fe₂O₃ Used Coercive Force (Oe) | Modification Conditions | | | | | Magnetic Tapes | |
|---|---|---|---|---|---|---|---|---|
| | | FeSO₄ 7H₂O (moles) | CoSO₄ 2H₂O (moles) | NaOH (mole/l) | Temp. (°C.) | Time (hr) | Coercive Force (Oe) | Squareness Ratio |
| 3  | 450 | 0.36 | 0.15 | 2.5 | 40 | 1 | 650 | 0.85 |
| 4  | 430 | 0.34 | 0.17 | 2.0 | 40 | 3 | 700 | 0.86 |
| 5  | 435 | 0.37 | 0.15 | 2.5 | 40 | 3 | 680 | 0.85 |
| 6  | 440 | 0.36 | 0.15 | 4.5 | 50 | 3 | 685 | 0.86 |
| 7  | 380 | 0.34 | 0.17 | 2.0 | 30 | 5 | 650 | 0.87 |
| 8  | 440 | 0.25 | 0.12 | 1.5 | 30 | 5 | 600 | 0.85 |
| 9  | 400 | 0.54 | 0.18 | 4.5 | 50 | 3 | 730 | 0.83 |
| 10 | 435 | 0.31 | 0.13 | 0.5 | 40 | 3 | 595 | 0.87 |
| 11 | 445 | 0.34 | 0.17 | 2.0 | 30 | 5 | 690 | 0.84 |
| 12 | 430 | 0.25 | 0.12 | 1.0 | 50 | 3 | 580 | 0.86 |
| 13 | 430 | 0.36 | 0.15 | 2.0 | 40 | 4 | 675 | 0.85 |
| 14 | 440 | 0.25 | 0.12 | 1.0 | 50 | 3 | 590 | 0.86 |
| 15 | 390 | 0.54 | 0.18 | 4.5 | 50 | 3 | 710 | 0.83 |
| 16 | 390 | 0.25 | 0.12 | 1.0 | 40 | 5 | 580 | 0.83 |
| 17 | 405 | 0.31 | 0.13 | 0.5 | 40 | 3 | 560 | 0.84 |
| 18 | 440 | 0.25 | 0.12 | 1.5 | 30 | 5 | 590 | 0.85 |
| 19 | 450 | 0.36 | 0.15 | 2.5 | 40 | 5 | 675 | 0.86 |
| 20 | 390 | 0.25 | 0.12 | 1.5 | 30 | 5 | 540 | 0.83 |
| 21 | 430 | 0.34 | 0.17 | 0.5 | 40 | 3 | 700 | 0.83 |
| 22 | 430 | 0.37 | 0.15 | 4.0 | 40 | 3 | 680 | 0.84 |
| 23 | 420 | 0.31 | 0.13 | 2.0 | 50 | 3 | 600 | 0.82 |

What is claimed is:

1. A method of producing cobalt-modified magnetic particles which comprises:

(a) heating an aqueous suspension of amorphous ferric hydroxide at an elevated temperature from 100° C. to 250° C. at an alkaline pH in the presence of an effective amount of at least one growth regulating agent dissolved in the suspension, in the presence or in the absence of α-ferric oxide seed crystals of minor axes not more than 0.4 microns in average in amounts of 0.1–25 mole % in terms of Fe content in relation to the ferric hydroxide in the suspension, the growth regulating agent being selected from the group consisting of an organic phosphoric acid, a hydroxycarboxylic acid, a polybasic acid, an aminocarboxylic acid, an aminosulfonic acid, an aromatic sulfonic acid, a thiocarboxylic acid, a water soluble salt of any one of the acids, a water soluble ester of any one of the acids, a polyamine, a thioalcohol, a polyhydric alcohol and a β-dicarbonyl compound, for a length of time sufficient to convert the amorphous ferric hydroxide into acicular α-ferric oxide, (b) converting the α-ferric oxide into γ-ferric oxide by reduction thereof followed by oxidation, and (c) forming an aqueous suspension of the γ-ferric oxide and ferrous hydroxide and cobaltous hydroxide in amounts of 0.5–50 mole %, respectively in relation to the Fe content of the γ-ferric oxide in the suspension, said suspension having an alkaline pH and maintaining the suspension at a temperature from 30° C. to 50° C. for a time sufficient to form a cobalt modified γ-ferric oxide; said cobalt modified γ-ferric oxide when incorporated into a tape effecting a magnetic recording tape having an improved squareness ratio.

2. The method as claimed in claim 1 wherein the organic phosphonic acid has the formula:

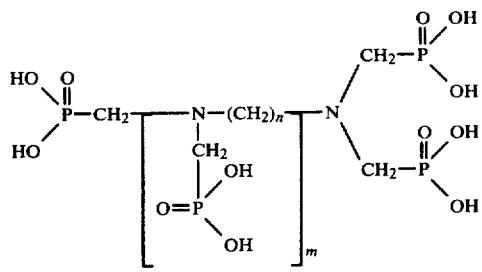

wherein n is an integer of 2–6, and m is an integer of 0–5.

3. The method as claimed in claim 1 wherein the organic phosphonic acid has the formula:

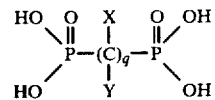

wherein X and Y are hydrogen, hydroxy, amino or C₁–C₆ alkyl or aryl, and q is an integer of 1–6.

4. The method as claimed in claim 1 wherein the organic phosphonic acid has the formula:

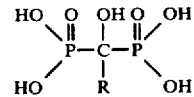

wherein R is hydrogen or C₁–C₅ alkyl.

5. The method as claimed in claim 1 wherein the hydroxycarboxylic acid is an aliphatic α-hydroxycarboxylic acid selected from the group consisting of citric acid, tartaric acid, glycolic acid, malic acid, dihydroxyglutaric acid, propyltartronic acid, agaritic acid, norcaperatic acid and desoxalic acid.

6. The method as claimed in claim 1 wherein the polybasic acid is propane-1,2,3-tricarboxylic acid.

7. The method as claimed in claim 1 wherein the aminocarboxylic acid is tyrosine.

8. The method as claimed in claim 1 wherein the polyamine is tris(2-aminoethyl)amine.

9. The method as claimed in claim 1 wherein the polyhydric alcohol is pentaerythritol.

10. The method as claimed in claim 1 wherein the aromatic sulfonic acid is sulfophenyliminodiacetic acid.

11. The method as claimed in claim 1 wherein the thioalcohol is mercaptoethyliminodiacetic acid.

12. The method as claimed in claim 1 wherein the aminosulfonic acid is taurine.

13. The method as claimed in claim 1 wherein the pH of the ferric hydroxide suspension ranges from 8.0 to 12.5.

14. The method as claimed in claim 1 wherein the hydroxyl ion concentration of the alkali in the $\gamma$-ferric oxide suspension ranges from 0.5 to 5.0 moles/liter.

15. The method as claimed in claim 1 wherein the growth regulating agent is present in the suspension at a concentration of $1 \times 10^{-5}$ to 3.0 moles per mole of the ferric hydroxide in the suspension.

16. The method as claimed in any one of claims 1 to 15, wherein step (a) is performed in the presence of $\alpha$-ferric oxide seed crystals.

* * * * *